United States Patent
Walder

(10) Patent No.: US 6,783,710 B1
(45) Date of Patent: Aug. 31, 2004

(54) METHOD FOR THE PRODUCTION OF EXPANDABLE PLASTICS GRANULATE

(75) Inventor: Andreas Walder, Greifensee (CH)

(73) Assignee: Sulzer Chemtech AG, Winterhur (CH)

( * ) Notice: Subject to any disclaimer, the term of this patent is extended or adjusted under 35 U.S.C. 154(b) by 0 days.

(21) Appl. No.: 09/082,309

(22) Filed: May 20, 1998

Related U.S. Application Data

(63) Continuation of application No. 08/378,304, filed on Jan. 25, 1995, now Pat. No. 5,515,909.

(30) Foreign Application Priority Data

Feb. 21, 1994 (EP) ............................. 94810098

(51) Int. Cl.$^7$ ............................................. B29C 44/22
(52) U.S. Cl. .................. 264/40.7; 264/53; 264/143; 264/348; 264/DIG. 13; 264/DIG. 17; 425/4 R; 521/56
(58) Field of Search .................. 264/50, 53, 54, 264/143, 148, DIG. 13, DIG. 17, 348, 40.7; 521/56; 425/4 R

(56) References Cited

U.S. PATENT DOCUMENTS

| | | | | |
|---|---|---|---|---|
| 3,372,215 A | * | 3/1968 | Muirhead et al. ............. | 264/53 |
| 3,751,377 A | * | 8/1973 | Buckner ....................... | 521/58 |
| 3,941,529 A | * | 3/1976 | Klingebiel ................... | 425/244 |
| 4,314,606 A | * | 2/1982 | Muller et al. ................ | 165/163 |
| 5,026,736 A | * | 6/1991 | Pontiff .......................... | 521/60 |
| 5,158,986 A | * | 10/1992 | Cha et al. ..................... | 521/82 |
| 5,225,488 A | * | 7/1993 | Baird et al. .................. | 525/132 |

FOREIGN PATENT DOCUMENTS

EP   0 445 847   * 4/1988

* cited by examiner

Primary Examiner—Stefan Staicovici
(74) Attorney, Agent, or Firm—Townsend and Townsend and Crew LLP

(57) ABSTRACT

Apparatus and method for the production of expandable plastics granulate (C). A plastics melt (A') is impregnated by a fluid blowing agent (B), which is, at an elevated pressure within a predetermined pressure range, only partly soluble in the melt. The method comprises the following steps: 1. dispersion of the blowing agent in the melt, 2. retaining of the mixture within a predetermined pressure range for a predetermined retention time, 3. cooling of the melt impregnated by the blowing agent to a temperature which is several degrees Celsius above the solidification temperature of the melt, and 4. granulating the cooled mixture.

4 Claims, 2 Drawing Sheets

METHOD FOR THE PRODUCTION OF EXPANDABLE PLASTICS GRANULATE

This application continuation of and claims the benefit of U.S. patent application Ser. No. 08/378,304 filed Jan. 25, 1995 now U.S. Pat. No. 5,515,909.

BACKGROUND OF THE INVENTION

1. Field of the Invention;

The invention relates to a method for the production of expandable plastics granulate and equipment and plant for carrying out or using the method.

2. Description of the Prior Art;

An often used foamed plastics is made of polystyrene. In this process granulate of "expandable polystyrene", EPS, is processed into blocks or molded parts, while in an intermediate step the granulate is prefoamed. EPS may be manufactured by-suspension polymerization. In that process styrene is polymerized in an aqueous phase with the addition of a blowing agent. In this way a beadshaped granulate is produced within a wide range of bead sizes. A disadvantage of this method is that large quantities of water, which must be cleaned, accumulate and that the granulate is usable for the production of the foamed material only within a limited range of sizes so that a considerable part of the produced polymer must be discarded (or recycled).

In another method, which is little suitable for the production of large quantities of EPS, the polystyrene is, after polymerization, impregnated by a blowing agent in pressure vessels or in extruders. The product is cylindrical granulate.

Further information on foamed materials can be found in Ullmanns Encyklopädie der technischen Chemie (4th edition, 1981), volume 20, pages 415 to 432 and volume 19, pages 268 and 131.

SUMMARY OF THE INVENTION

The aim of the invention is to provide a method of economical production of expandable plastics granulate, for instance of EPS, by which may be produced large quantities without the disadvantages of the known methods. According to this method a plastics melt is impregnated with a fluid blowing agent which is, at elevated pressure within a given pressure region, only partially soluble in the melt.

Large quantities of Eps or another comparable granulate cannot be economically produced by extruders, because a plurality of extruders used in parallel would have to be used. The use of the equipment according to the invention, in which the impregnation of the plastics melt may be carried out in a single apparatus, represents an economical advantage. The teaching of the invention is based substantially on the discovery that large quantities of expendable plastics granulate may be produced in an apparatus only if provisions against segregation of the melt and blowing agents are possible and are made. According to the invention static mixing elements act during the whole course of the process continuously onto the mixture in such a way that segregation is avoided.

Compared with the known methods using extruders, the method according to the invention has the further advantage that much less energy—about one order less—is needed for the production of expandable plastics granulate. With this advantage is connected a second one, namely that there is a smaller temperature rise during the impregnation and consequently less heat need be dissipated.

By the addition not only of a blowing agent but also several additives to the melt, the quality of the product can be advantageously influenced. As a blowing agent preferably a chlorofluorocarbon or a low-boiling hydrocarbon, particularly pentane, or a mixture of such hydrocarbon, is used. As additives flameproofing agents (compounds of bromine), lubricants (oil, derivatives of stearic acid), dyes, antioxidants softeners or nucleators (for the formation of cells) may be used.

DESCRIPTION OF THE PREFERRED EMBODIMENTS

Figure 1:
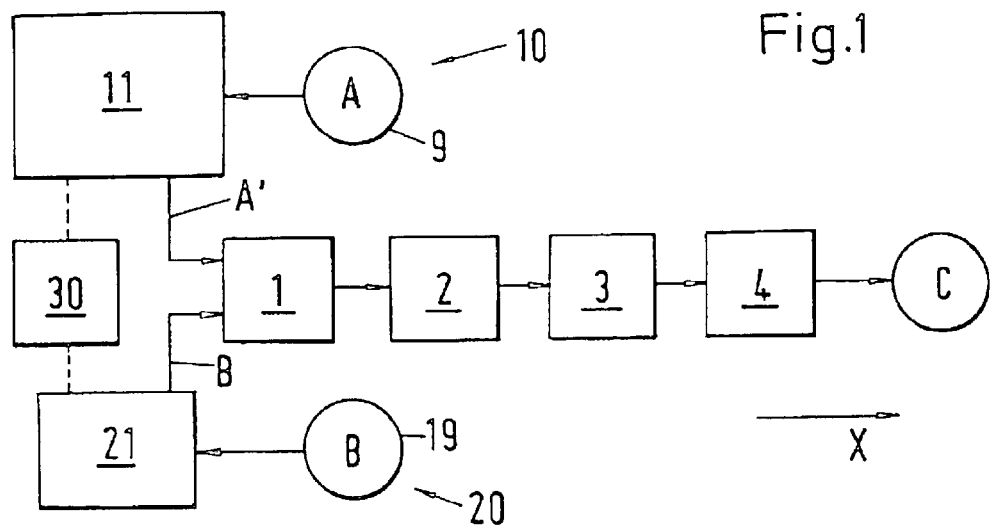
FIG. 1 is a block diagram for the explanation of the plant or method according to the invention.

In the block diagram of FIG. 1 the reference numerals 1 to 4 relate to four method steps, dispersion 1, retention 2, cooling 3 and granulation 4. These method steps correspond in the pressure diagrams of FIGS. 2 and 3 the intervals I, II, III, IV. Because the individual blocks of the diagram in FIG. 1 are interpreted as parts of the plant, the same references may be used for the plant parts in FIG. 4 as in the block diagram. In FIG. 1 these plant parts 1, 2, 3 and 4 arranged linearly in the direction of the x-axis. The raw materials for the method are a plastics A (or a monomer A) and a blowing agent B (possibly with the addition of one or more additives); the product is the expandable plastics granulate C to be produced.

FIG. 1 shows—interpreted as a plant—the following parts: a source 10 of plastics with a tank 9 for A and a device 11 in which is produced a gas-free plastics melt A'; a source 20 of blowing agent with a tank 19 containing B and a device 21 by means of which B can be metered; a control unit 30 by means of which the amount of B can be adjusted to the amount of A'; and finally the equipment 1, 2, 3, 4, in which is carried out the method according to the invention.

In the dispersion step 1 the melt A' is mixed at elevated pressure with the blowing agent B, the melt being subjected to extensive shearing so that the liquid blowing agent is dispersed in the melt in the form of fine droplets. During a predetermined retention time in step 2, the blowing agent partly diffuses in the melt. Impregnation, which is carried out in both the first two steps, proceeds preferably at a temperature which lies considerably above the solidification temperature of the melt. The higher the temperature means the smaller the viscosity of the melt and therefor the better the distribution of the blowing agent proceeds.

In the cooling step 3 the temperature of the melt impregnated by the blowing agent is reduced several degrees celsius above the solidification temperature of the melt. The cooled mixture is then in the last step 4 transformed to granulate form.

To avoid any segregation during the passage through the equipment 1, 2, 3, 4, the mixture is kept in motion in all method steps and also during transfer from one step to the next; this is achieved, according to the invention, by using static mixing elements.

The source 10 of plastics may contain a polymerization reactor for the production of the plastics A' from a monomer raw material A and also a degassifier for the polymer. The source 10 of plastics may also include a recycling device for the recycling of the thermoplastic and a melting device. The thermoplastic should be preferably of the same kind. Also a melting device for a granular thermoplastic may be used as a source of plastics. For instance a heatable extruder may be used as the melting device.

Figure 2:
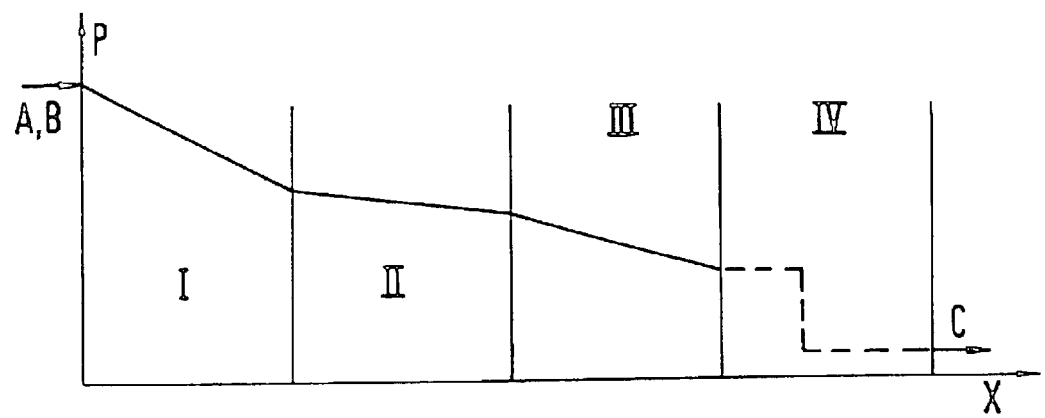
FIG. 2 is a graph illustrating the course of the pressure p for the equipment according to the invention.

FIG. 2 shows qualitatively the course of pressure p in the four method steps. During the dispersion, interval I, the pressure drop is due to the extensive shearing being relatively large compared with the pressure drop in the second step, interval II. The cooling, interval III, takes place again with a larger pressure drop which is the result of provisions for achieving efficient heat exchange. During the granulation step, interval IV the mixture is extruded through nozzles while the pressure sharply drops. So as to avoid expansion of the formed strands by the blowing agent, the extruded mixture must be abruptly cooled by a coolant, preferably water.

Figure 3:
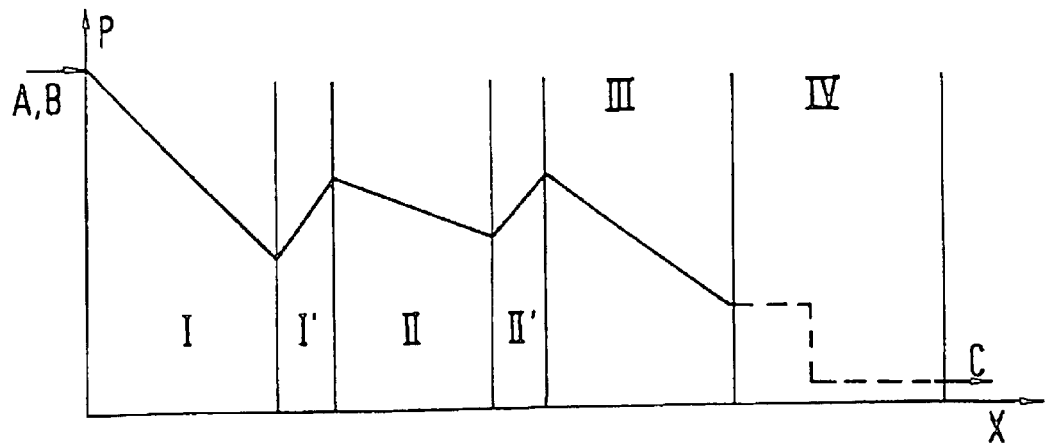
FIG. 3 is a graph illustrating the course of pressure in a second embodiment and FIG. 4 is a diagram illustrating a plant for the production of EPS according to the invention.

Between the steps 1 and 2 and/or steps 2 and 3 may be provided pumps by means of which the pressure is again increased. This is shown in FIG. 3, where the intervals I' and II' are associated with such provisions.

Figure 4:
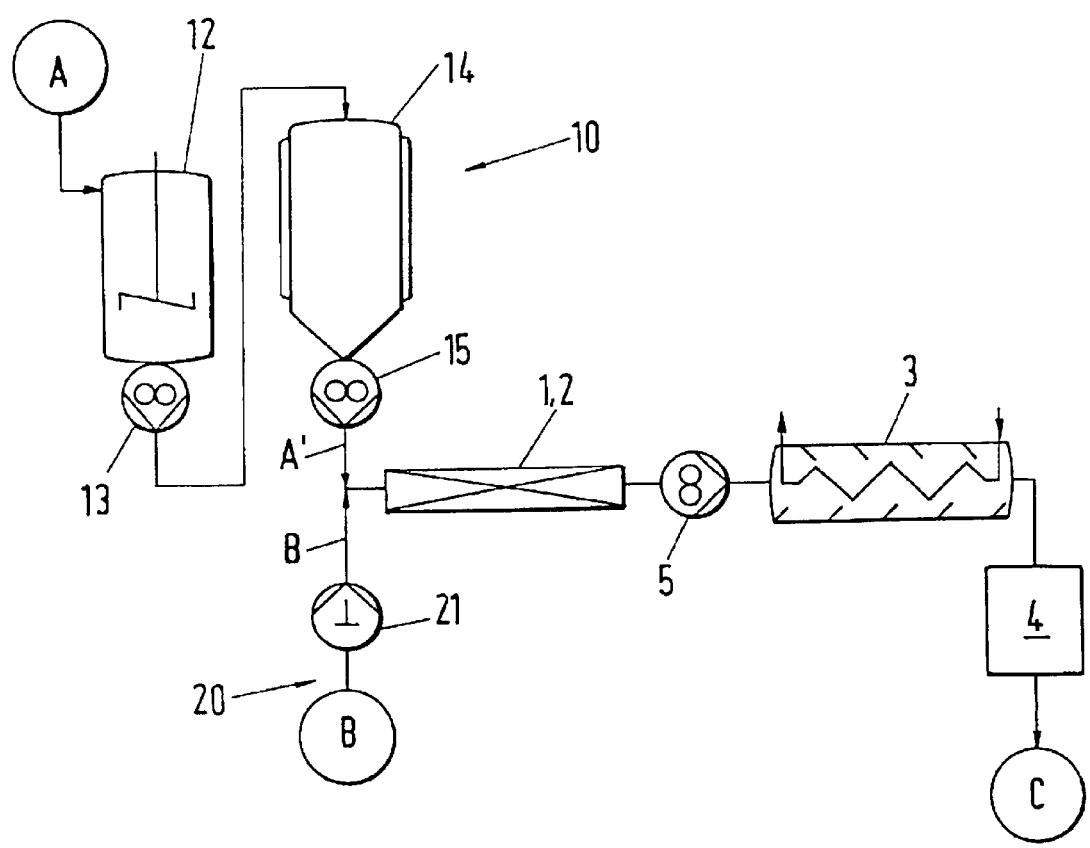

In the embodiment shown in FIG. 4 the source 10' of plastics is formed by a polymerization reactor 12 for the production of polystyrene from the monomer raw material A' (styrene), by a degassifier 14 for the polymer and two gear pumps 13 and 15. The blowing agent B' (for instance n-pentane) is fed from source 20' to the melt A' by a metering piston pump 21'.

The impregnation is performed in the unit 1', 2' at an initial pressure of e.g. 100 bar (=10 MPa) and a temperature of about 200° C. This unit preferably contains a first static mixer, "shearing mixer" 1' for the dispersion of the blowing agent and a second static mixer, "retention time mixer" 2', situated immediately next to the first one and serving for diffusive transport of the blowing agent into the melting phase. (The two mixers 1' and 2' are not shown in FIG. 4 as components.) In the shearing mixer 1' the dispersison is performed with more intensive shearing of the melt while fine droplets of the blowing agent are formed. The intensive shearing is achieved by a high flow rate. In the retention time mixer 2' the mixture is subjected, during a retention time needed for the diffusive transport, to little shearing. The uneven flowing conditions in the two mixers are obtained in that the second mixer is made with a much larger cross-sectional area than the first one.

A gear pump 5 pumps the impregnated melt into the unit 3' in which is combined mixing by static means with heat exchange. Preferably a device known from DE A 28 39 564 is used, namely a static mixer whose crossing elements are made as heat exchange pipes. Such a device is illustrated in FIG. 4 the pressure drop is, for instance, 100 bar and the initial temperature about 120° C. As a cooler a heat exchanger containing a bundle of pipes may be used whose individual pipes are provided with static mixing elements.

Finally the impregnated and cooled melt is in a strand granulator 4', which contains a nozzle plate 41, a cooling bath 43 and a cutting device 42, converted into the desired product C', namely EPS. The pressure drop upstream of the nozzle plate is at least 10 bar. As a cooling bath cooling water bath (about 10° C.). The strands emerging from the nozzles (diameter smaller than 1 mm) are first cooled and finally cut by a cutter with several blades. The product is a granulate with granulate grains of uniform size. As a consequence—in contrast to the suspension polymerization mentioned at the beginning—the whole product may be used for the production of foamed plastics.

As a granulation device may be used, apart from the strand granulator, and a hot strand chopping granulator or a so-called underwater granulator may also be used. In the underwater granulater granulate may be made whose grains have practically the same shape as the granulate grains produced by suspension granulation.

What is claimed is:

1. In a method for producing expandable plastic granulate from a plastic material and a fluid blowing agent that is only partially soluble in the plastic material when the plastic material is at an elevated temperature by heating the plastic material to the elevated temperature to form a plastic melt;

dispersing the blowing agent in the melt to form a mixture;

retaining the mixture for a predetermined time at the elevated temperature and pressure for a predetermined time interval; and thereafter cooling and granulating the mixture, the improvement comprising:

providing a first static mixer in which the dispersing step is carried out and which subjects the mixture to intensive shearing; and providing a second static mixer in which the retaining step is carried out and which subjects the mixture to less intensive shearing than in the first static mixer.

2. A method according to claim 1 wherein subjecting the mixture to intensive shearing and to less intensive shearing comprise flowing the mixture through the first static mixer at a relatively high flow rate and flowing the mixture through the second static mixer at a relatively low flow rate.

3. A method according to claim 1 wherein subjecting the mixture to intensive shearing in the first static mixer comprises providing the first static mixer with a relatively small cross-sectional flow-through area and wherein subjecting the mixture to less intensive shearing in the second static mixer comprises providing the second static mixer with a relatively large cross-sectional flow-through area.

4. A method for producing expandable plastic granulate from a plastic material and a fluid blowing agent comprising melting the plastic material at an elevated temperature to form a melt and subjecting the melt to an elevated pressure;

providing first and second, serially arranged static mixers, the first static mixer having a relatively smaller cross-sectional flow-through area and the second mixer has a relatively larger cross-sectional flow-through area;

injecting the blowing agent into the melt to form a flowable mixture;

flowing the mixture serially through the first and second static mixers wherein the smaller cross-sectional area of the first static mixer subjects the mixture to relatively high intensity shearing as the mixture flows through the first static mixer and the larger cross-sectional flow-through area of the second static mixer subjects the mixture to relatively less intense shearing as the mixture flows through the second static mixer; and thereafter cooling the mixture and forming expandable granulate therefrom.

* * * * *

UNITED STATES PATENT AND TRADEMARK OFFICE
CERTIFICATE OF CORRECTION

PATENT NO. : 6,783,710 B1
DATED : August 31, 2004
INVENTOR(S) : Andreas Walder

It is certified that error appears in the above-identified patent and that said Letters Patent is hereby corrected as shown below:

Title page,
Item [63], Related U.S. Application Data, please replace "Continuation of application No. 08/378,304 filed Jan. 25, 1995, now U.S. Pat. No. 5,515,909." with -- Continuation of application No. 08/378,304, filed Jan. 25, 1995, now abandoned. --

Signed and Sealed this

Seventeenth Day of May, 2005

JON W. DUDAS
*Director of the United States Patent and Trademark Office*